Oct. 29, 1940.    J. PLEBANSKI    2,219,397
ELECTRIC CONTROL SYSTEM
Filed Aug. 10, 1938    4 Sheets-Sheet 1

INVENTOR.
Jozef Plebanski
BY
ATTORNEY.

Patented Oct. 29, 1940

2,219,397

UNITED STATES PATENT OFFICE 2,219,397

ELECTRIC CONTROL SYSTEM

Jozef Plebanski, Warsaw, Poland, assignor to Radio Patents Corporation, a corporation of New York Application August 10, 1938, Serial No. 224,061
In Poland August 21, 1937

10 Claims. (Cl. 175—363)

The present invention relates to means and a method for controlling electric energy and among the objects of the invention is to control the energy flow between direct current and alternating current systems connected through a gaseous discharge tube rectifier or inverter.

A more specific object is to control the output current supplied by a gaseous discharge rectifier connected to an alternating current network and feeding a direct current load or utilization circuit.

In the art of gas filled rectifiers or inverters both of the incandescent cathode and mercury pool type comprising a grid or equivalent controlling element for initiating the discharge two fundamental methods have become known for controlling the discharge current. According to one method known as amplitude method a control voltage applied to the grid is varied until a discharge arc is started through the device. According to the more practical and efficient second method known as phase method, an alternating voltage is applied to both the anode and the grid or equivalent control element. The control of the discharge current in this case is effected by varying the phase between the grid and anode voltages, thereby determining the instant of firing or initiation of the discharge through the device during the conducting or positive cycles of the anode voltage, resulting in a corresponding variation of the average discharge current flowing through the output or load circuit.

A further object of the invention is to provide improved means and a method for adjusting the phase of the starting or firing potential to effect a manual or automatic regulation of the output current in a rectifier or inverter system.

Another object is to regulate automatically the current or potential at a point in an alternating current system or network in any desired manner in dependence upon the load current.

A further object is to provide an arrangement and a method for converting a variable direct or uni-directional current into an alternating current of substantially constant amplitude but having a time phase varying in accordance with the fluctuation of the direct current or in other words to produce a phase modulated alternating current or potential.

The above and further objects and aspects of the invention will become more apparent from the following detailed description taken with reference to the accompanying drawings forming part of this specification and wherein.

Like reference characters identify like elements throughout the different views of the drawings.

Figures 1, 2:
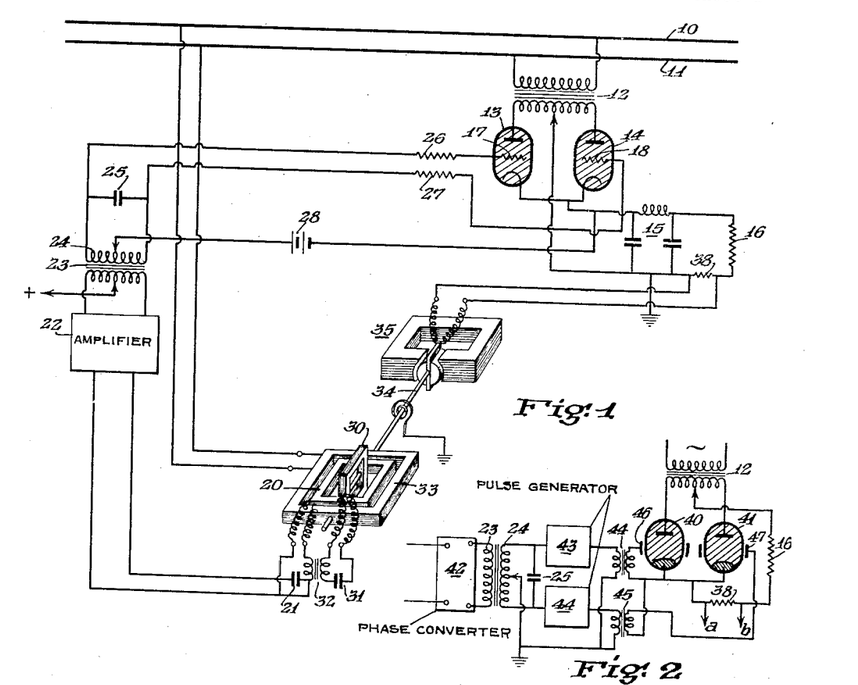
Figure 1 is a diagrammatic representation of a rectifying system embodying an improved control arrangement according to the invention.
Figure 2 illustrates a modification of Figure 1.

Referring more particularly to Figure 1, items 10 and 11 represent an alternating current line or network, 12 is a transformer, 13 and 14 a pair of gaseous discharge devices or rectifier valves having control grids 17 and 18, respectively, and being connected to the secondary of the transformer 12 on the one hand and to a direct current output circuit in a manner well known in the art of double wave rectifiers. For the latter purpose, the opposite terminals of the secondary winding of the transformer 12 are connected to the anodes of valves 13 and 14, the cathodes of which are joined together and connected to one terminal of the direct current output circuit represented in the example illustrated by a load resistance 16, the other terminal of the load being connected to the center tap of the secondary of the transformer 12. A filter 15 of usual construction is placed between the rectifier valves and the output circuit to suppress fluctuations or alternating current ripples superimposed upon the steady rectified current and to obtain a substantially smooth direct output current.

The gaseous rectifiers 13 and 14 may be of any known type such as those having an incandescent cathode and filled with mercury or any other suitable gas also known as thyratrons or cold cathode rectifiers comprising a mercury pool as a cathode.

In an arrangement of the above type, the rectifiers 13 and 14 are alternately conductive during successive half cycles of the supply current, while the amount of the current passed may be controlled by adjusting the phase of the alternating firing potentials applied to the grids 17 and 18, respectively, in the manner described in the following.

According to the invention the potentials for firing the grids 17 and 18 to initiate the discharge through the devices 13 and 14 are supplied from a resonant circuit tuned to the line frequency, usually 60 cycles, and comprising an induction coil 20 shunted by a condenser 21. This resonant circuit is excited from the line or network 10, 11 through a primary winding circuit 33 arranged in inductive relation with the induction coil 20. The output of the circuit 20, 21 is applied to an amplifier 22 having a transformer with a primary 23 and secondary 24 connected in its output circuit. The secondary 24 is tuned to the line frequency by means of a shunt condenser 25. The amplifier 22 may be of any known type such as a push-pull amplifier supplied with operating potential in any known manner as indicated by the + sign in the drawings. The opposite terminals of the output circuit 24, 25 are connected to the grids 17 and 18 through resistances 26, 27 to supply firing or discharge initiating potential for the valves 13 and 14, respectively. Item 28 is a source for providing steady grid biasing potential for the rectifiers 13 and 14. The input circuit 20, 21 is coupled through a transformer 32 to a further resonant circuit comprising an induction coil 30 shunted by a condenser 31. Both coils 20 and 30 are arranged at a fixed right angle relative to each other and mounted upon a common shaft 34 for rotation within the primary coil 33.

As described in my copending application, Serial No. 133,793, filed March 30, 1937, the phase of the current in the circuit 20, 21, providing proper design of the circuit constants (tuning of both circuits 20, 21 and 30, 31 to the line frequency, i. e. usually 60 cycles) and the mutual coupling by the transformer 32, will depend upon the angle between the coils 20 and 30. According to the most favorable adjustment and design the non-reactive or loss resistances of both circuits are equal to each other and to the mutual coupling inductance between the circuits as described in said copending patent application. The adjustment may further be such that the time phase of the currents supplied by the circuit 20, 21, corresponds to the actual geometrical angle between the coils 20 and 30. The axis 34 carrying the coils 20 and 30 is mechanically connected to the rotating member of a moving coil device 35, whereby the actual angle and accordingly the phase of the currents in the output circuit 24, 25 of the amplifier 22 is proportional to the current flowing through the coil of the moving coil instrument or in other words, the phase of the firing potentials supplied to the grid 17 and 18 varies in proportion to the potential impressed upon the moving coil device. This potential may be adjusted manually by means of a voltage divider connected to a battery. By adjusting the voltage divider it is thus possible to control the phase of the firing potentials and as a result the instant of initiation of the discharge through the rectifiers 13 and 14 during the respective positive or conductive cycles of the alternating currents impressed thereon, resulting in a corresponding variation of the direct output or load current passing through the load resistance 16.

Figures 4, 5, 6, 7, 8:
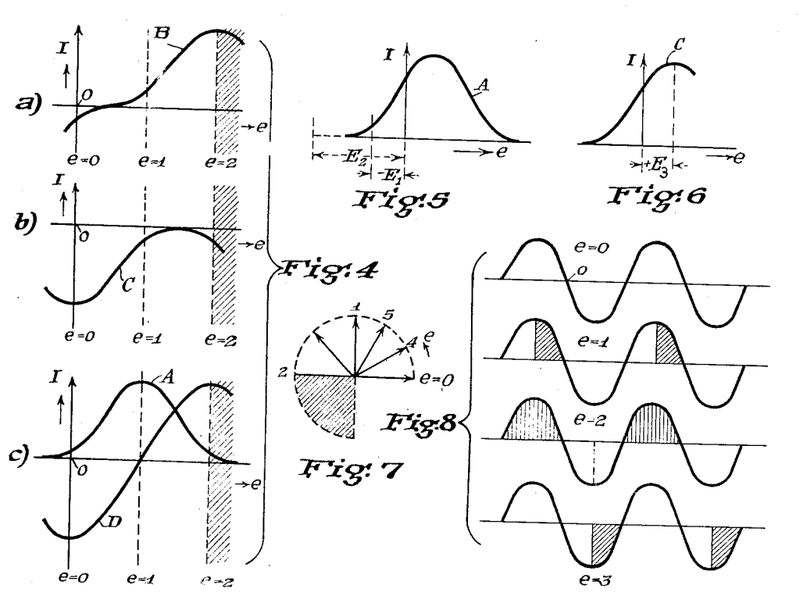
Figures 4 to 8 are theoretical diagrams explanatory of the function of the arrangements shown in the previous figures.

In place of the voltage divider and a special battery, the moving coil instrument 35 may be adjusted automatically by directly connecting it to a small resistor 38 connected in series with the load 16 as shown in the diagram. In this case, the deflection of the moving coil and in turn the phase of the firing potentials will be proportional to the load current. Thus, if no current is delivered to the load, that is when the resistance 16 is very large or the load circuit open, the adjustment of the system may be such that the time phase of the firing potentials is such as marked by $e=0$ relative to the phase of the anode voltage in Figures 7 and 8, that is the firing potentials are impressed when the anode potential is 0 and changes to negative values. As a result, the rectifiers are blocked and no current is delivered to the output circuit. If the load current increases the device 35 will turn to a definite position, whereby the circuit 24, 25 will supply firing potentials of a different phase such as marked by $e=1$ in Figures 7 and 8. As a result, the firing of the rectifiers will occur at maximum anode potential and a corresponding current be delivered to the output circuit. If the load current increases still further, the phase of the firing potentials will be further changed such as to $e=2$ as shown in Figures 7 and 8, that is a still greater amount of direct current is supplied to the load circuit. For any intermediate variations, the phase of the firing potential will assume an intermediate value such as shown at $e=4$ and $e=5$ in Figure 7, and cause a corresponding variation of the load current. In this manner, the output voltage of the rectifying system may be kept automatically constant independently of load variations. Alternatively, the arrangement may be such that with an increase of the load the output voltage is increased, that is over regulation is employed. Instead of controlling the output voltage in dependence upon the current by employing a resistance (38) in series with the load current for deriving current energizing the moving coil instrument, the latter may be directly connected across the load terminals in which case the control is effected in dependence upon the terminal voltage at the rectifier output.

Referring to Figure 2, there is shown a similar arrangement to Figure 1 comprising a pair of mercury pool rectifiers 40 and 41 with external or capacitative control electrodes 46 and 47, respectively, which may be in the form of a wire grid or mesh applied to the exterior surface of the glass envelope. Item 42 represents collectively a phase converting system having a tuned output circuit 24, 25 of substantially the same type shown in Figure 1. In the embodiment illustrated, the firing potentials supplied by the resonent circuit 24, 25 are converted into short impulses or peaks by the aid of pulse generators 43, 44, respectively, which may be of the type as disclosed in U. S. Patent No. 2,103,090, issued December 21, 1937, in the name of the present applicant or which may consist of saturated iron core transformers or any other known arrangement for changing a sinusoidal voltage into a sharply peaked voltage. The firing potential impulses thus obtained are applied to the control electrodes 46 and 47 through transformers 44, 45, respectively.

As is understood any other type of gaseous discharge device with a firing or discharge initiating electrode may be employed with equal advantage in an arrangement according to the invention. Thus, the firing electrode may consist of an element immersed in a mercury pool and adapted to initiate a discharge arc by a control potential impressed upon it, devices of this type being known in the art as ignitrons.

Figure 3:
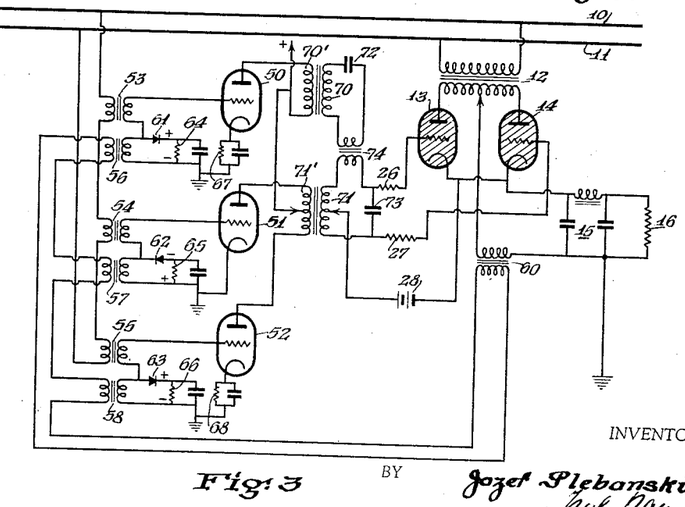
Figure 3 shows a further modification of a rectifying system of the type according to Figure 1 operating purely electrically without the necessity of mechanically moving devices.

Referring to Figure 3, there is illustrated an arrangement of a similar character to Figure 1 wherein a system operating purely electrically without the necessity of mechanically moving elements is substituted for the moving coil instrument and phasing coil structure shown in Figure 1. In this embodiment, the rectifier system is substantially the same as shown in Figure 1. The phasing arrangement however comprises three amplifying valves 50, 51, 52 of the type generally used in radio and similar systems and each having at least a cathode, a control grid and an anode electrode. The grids of these devices are excited on the one hand by alternating potential derived from the line 10, 11 through transformers 53, 54 and 55 having secondaries connected to each of the grids of the amplifying valves 50—52. In addition, there are impressed upon the grids of the amplifying devices 50—52 potentials varying in accordance with fluctuations of the load current delivered by the rectifying system. In the example illustrated, these potentials are derived through a transformer 60 connected in series with the load and supplying through further transformers 56, 57, and 58 ripple current to rectifiers 61, 62, 63 connected in the grid circuits of the valves 50—52 in series with resistances 64, 65, and 66, respectively, the latter being shunted by condensers. In order to provide a steady grid biasing potential for the valves 50 and 52, further resistances 67 and 68 shunted by condensers are connected in the cathode leads in a manner well known. The rectifiers 61, 62, and 63 may be in the form of crystal detectors or copper oxide rectifiers or of any other suitable type.

In Figure 5 there is shown a diagram representing the alternating output or anode potential of valve 50 exciting a tuned circuit comprising an induction coil 70 and condenser 72 and being inductively coupled with the primary 70' in the output circuit of valve 50. In this diagram the ordinates represent the alternating anode current T or potential and the abscissa $e$ represent the grid bias or modulating potential produced by the rectifier 61, that is a potential varying in dependence upon fluctuations of the load current. From Figure 5, it is seen that by making the grid bias less negative or more positive, the anode current or potential first increases and then decreases after reaching a maximum. In the arrangement described, the constant or steady bias $-E_1$ of valve 50 as determined by the cathode lead resistance 67 is so adjusted that when the load and consequently the ripple current supplied by transformer 60 increases from 0 to a maximum, the output potential in circuit 70, 72 varies between $e=0$ and $e=2$ as shown by curve A in Figure 4c which corresponds to curve A in Figure 5.

A further tuned circuit comprising an induction coil 71 shunted by condenser 73 and coupled with the circuit 70, 72 through a coupling transformer 74 is excited in push-pull by the amplifying valves 51 and 52 through the primary winding 71' connecting the anodes of valves 51 and 52. The steady bias potentials of valves 51 and 52 are adjusted in such a manner that when the direct load or ripple current increases from 0 to full load ($e=0$ and $e=2$, respectively) the output potential impressed upon the circuit 71, 73 changes along the curve D as shown in Figure 4c. This is obtained by adjusting the steady bias of valve 52 to be equal to $-E_2$ that is substantially less negative than the bias $-E_1$ of the valve 50 as indicated in Figure 5. Furthermore, the steady or constant bias of the valve 51 is given a positive value $+E_3$ relative to the bias of valves 50 and 52 as shown in Figure 6 by providing a suitable cathode lead resistor or omitting the same entirely as shown in the drawings. Alternatively, a special positive biasing source may be provided for the valve 51. By decreasing this positive bias of valve 51 by the modulation or control voltage supplied by transformer 57 by reversing the polarity of the rectifier 62 relative to the polarity of the rectifiers 61 and 63 and by impressing the output currents of valves 51 and 52 in opposite phase or push-pull upon the resonant circuit 71, 73 the potential or current in the latter supplied by valves 52 and 51 individually will vary according to curves B and C, respectively, as shown in Figures 4b and 4a, resulting in a combined current varying according to curve D in Figure 4c. Curves A and D are related to each other like sine and cosine functions. Curve A is not exactly a sine wave because it doesn't exactly pass through 0 for $e=0$ and $e=2$. However, an exact sine wave may be obtained by using three valves in place of the one valve 50 whereby the additional two valves supply currents in opposite phase and of suitable amplitude to the common output circuit 70, 72.

In the manner above described, an arrangement is obtained wherein the excitation of the circuit 70, 72 changes according to a sine wave and the excitation of the circuit 71, 73 changes according to a cosine wave in substantially the same manner as obtained by the rotary coil structure shown in Figure 1 or in other words, the current in the tuned circuit 70, 72 increases while the current in the tuned circuit 71, 73 decreases in proportion to the load current in such a manner as to control the phase of the current in the circuit 71, 73 by virtue of the function of the mutual coupling between the circuits through transformer 74 in a similar manner to the operation of Figure 1. Figure 2 differs, however, from Figure 1 in that the increase and decrease of the amplitudes of the currents in the phasing circuits in dependence upon the load current is effected purely electrically instead of mechanically as by rotation of the crossed coil structure 20, 30. The opposite terminals of the circuits 71, 73 are connected to the grids of the rectifier tubes 13 and 14 to control the initiation of the discharge in the manner substantially similar to Figure 1. The arrangement described may be adjusted in such a manner that if the current supplied by transformer 60 changes from 0 to full load (i. e. from $e=0$ to $e=2$) the phase of the current in the circuit 71, 73 varies constantly from 0 to 180°.

There is thus provided by the invention a relatively simple and efficient method and system for changing amplitude variations of both alternating or direct current into variations of phase or effecting a modulation of the time phase of an alternating current of substantially constant amplitude. The firing of the thyratron or other rectifying devices in Figure 3 is controlled purely electrically by converting amplitude fluctuations into corresponding variations of phase. In other respects, the function and operation of the system according to Figure 3 is substantially similar to the operation of the systems according to Figures 1 and 2.

The system described hereinbefore may also be adjusted in such a manner that in case of excess loads the phases of the firing potentials will fall within the hatched region shown in Figure 4, that is the firing of the rectifier occurs during the negative half cycles of the Thyratron or rectifier supply voltage as shown at $e=3$ in Figures 7 and 8, in which case the rectifier becomes an inverter and feeds back energy to the alternating current circuit thereby preventing damages and other defects caused by excess loads.

The control or modulation in the example illustrated is known as grid modulation but it is understood that any other type of modulation may be employed for the purpose of the invention provided a sufficient number of valves are used and arranged to co-act and energize a pair of coupled resonant circuits to secure a phase modulation in the manner described hereinbefore. Grid modulation as provided in the example illustrated has the advantage over other modulating systems that the modulation is not linear, but rather "sinusoidal", the latter being desirable and advantageous for the purpose of the invention as is understood from the above. When other types of modulation are used, the phase relation will not be the same as shown in Figure 7, that is the phase may change from only 15 to about 170° instead of from 0 to 180°.

Figure 9:
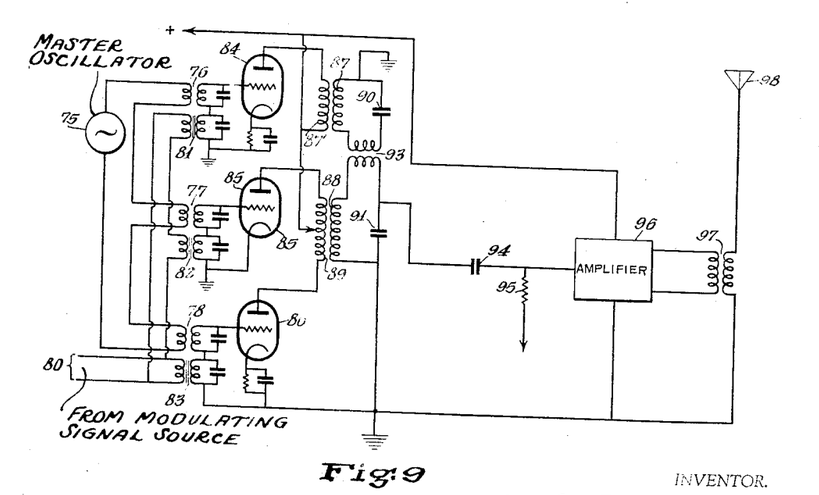
Figure 9 illustrates an embodiment of the invention for producing a phase modulated carrier wave for radio transmission or like purposes.

According to a further embodiment of the invention, an arrangement as described above may be advantageously used for phase modulation of a radio transmitter or any other signaling system. An arrangement of this type has been shown in Figure 9. In the latter wherein the phase modulating system is substantially similar to that shown in Figure 2 with the exception that audio or other modulating signal currents replace the rectified ripple or load responsive current variations in Figure 3, there are provided three amplifying valves 84, 85, 86 corresponding to valves 50, 51, 52 in Figure 3. The grids of the valves are excited on the one hand through transformers 76, 77, 78 by a carrier potential supplied from a master oscillator or driver 75 of suitable construction. In addition, the grids of valves 84—86 are modulated through modulating transformers 81, 82 and 83 in accordance with a modulating signal current supplied by a microphone or the like through a line 80. The valves 84 and 86 are provided with steady bias such as by the provision of cathode lead resistances shunted by condensers in substantially the same manner as described in Figure 3, that is, valve 86 is biased negatively and valve 85 positively with respect to valve 84 and the modulating potential is applied to valve 85 in opposite sense to the modulating potentials applied to valve 86 by proper adjustment of the winding sense of transformers 82 and 83, respectively. The resonant phasing circuits comprise induction coils 87 and 88 shunted by condensers 90 and 91, respectively, corresponding to circuits 70, 72 and 71, 73 in Figure 3. Circuit 87, 90 is coupled to the output of valve 84 through a coupling coil 87' and circuit 88, 91 is coupled to the output of valves 85 and 86 through push-pull primary winding 89. The tuned circuits 87, 90 and 88, 91 are mutually coupled through a transformer 93 similar as described in connection with Figure 3 (transformer 74) whereby there is obtained in the circuit 88, 91 a carrier current of substantially constant amplitude but having a time phase varying in dependence upon the variations of the modulating signal current supplied from a microphone or the like through line 80. This phase modulated carrier is impressed upon a power amplifier 96 through a coupling condenser 94 and grid leak resistance 95 and the amplified carrier current impressed upon an antenna 98 through a coupling transformer 97.

Figure 10:
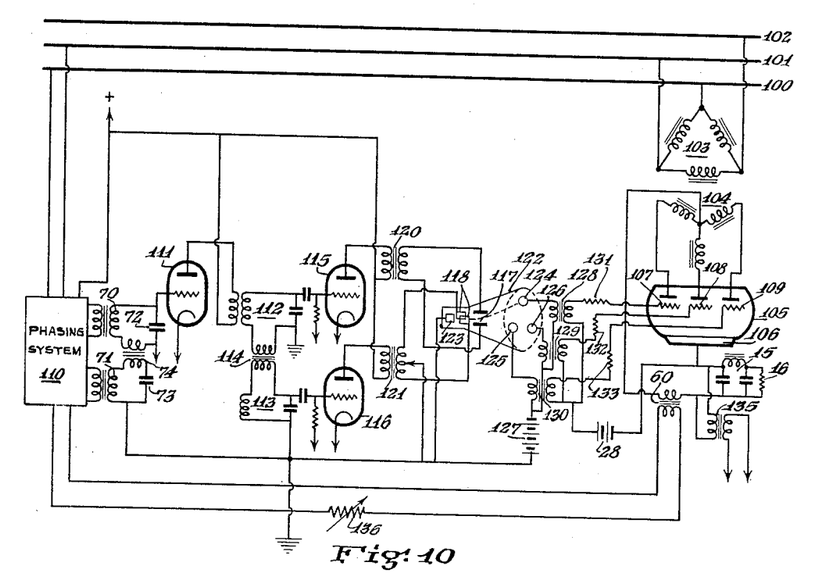
Figure 10 shows an improved rectifier system for three-phase current embodying an arrangement for automatic control of the output current or potential in accordance with the invention.

Referring to Figure 10, there is shown a three-phase rectifying system embodying the improved control arrangement according to the invention. Items 100, 101 and 102 represent the three lines of a three-phase network to which is connected the delta connected primary 103 of a transformer having a star connected secondary 104 energizing a three-phase mercury arc rectifier 105 of known construction comprising a cathode 106, three anodes and three control grids 107, 108 and 109, respectively. The direct current output circuit is connected in a known manner between the common cathode and the neutral or star point of the secondary 104. In order to control the current flow and maintain the output potential at a desired value a control current supplied by the fluctuations or ripples of the output current and derived through transformer 60 is utilized to control the starting or initiation of the discharge through the separate rectifying sections. For this purpose, the ripple current is applied through a variable resistance 136 to a phasing system collectively shown at 110 having a pair of mutually coupled phasing circuits 70, 72 and 71, 73 substantially as shown in Figure 3. The current of substantially constant amplitude and phase varying in dependence upon the ripple or load current supplied by the transformer 60 is amplified by a valve 111 and the amplified current applied to a resonant output circuit 112 which is in turn coupled to a further resonant circuit 113 through a coupling transformer 114. The circuits 112 and 113 and the mutual coupling of the transformer 114 are designed in such a manner that the currents in both circuits are in time phase quadrature. Both circuits 112 and 113 excite further amplifying valves 115 and 116, respectively, the amplified output currents of which are impressed through transformers 120 and 121, respectively, each upon a pair of deflector plates 117 and 118 of a cathode ray device 122. The deflector plates 117 and 118 are oriented at right angle relative to each other in such a manner that the electron beam or cathode ray produced by the gun 123 is continuously rotated and sequentially impinged upon three anodes 124, 125, 126 displaced by angles of 120°. The anodes 124—126 are each connected through transformers 128, 129, 130, to the grids 107, 108, 109 of the rectifier 105 through resistances 131, 132, 133, respectively. 127 is a common anode potential source for the anodes 125 to 126 and 28 is a biasing source for the grids of the rectifier 105. In this manner short potential impulses are produced in the circuits connected to the anodes 124—126 by the cathode ray striking the anodes which impulses serve to control the initiation of the arc or firing of the three discharge sections of the rectifier 105. If the rectified output current varies, the phase of the control potential supplied by the circuit 70, 72 varies accordingly resulting in turn in a leading or lagging of the rotation of the electron beam and accordingly in an advanced or retarded timing or initiation of the discharge through the three rectifying sections. In this manner, the output may be controlled depending upon the load current or alternatively depending upon the terminal voltage of the rectifier in which latter case the controlling ripple current is supplied by transformer 135 connected across the rectifier output terminals.

Figure 11:
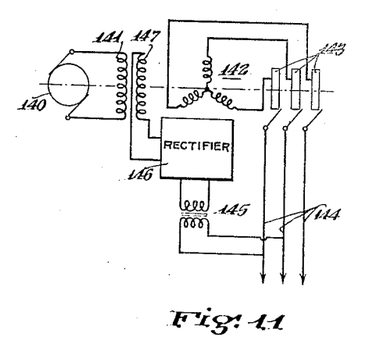
Figure 11 illustrates the invention as embodied in an alternating current generator for automatic voltage regulation.

Referring to Figure 11, there is shown an embodiment of the invention for controlling the terminal voltage of an alternating current generator. The generator is represented schematically by a three phase stator winding 142 connected to slip rings 143 feeding into a three phase line or network 144. Item 140 represents the armature of a direct current exciter having a field winding 141. According to the present invention, a rectifying system 146 which may be of the type shown in Figures 1 to 3 or 10 is connected to the output terminals of the generator through a transformer 145 supplying alternating current to the rectifier. The varying output current of the rectifier is impressed upon a separate field winding 147 of the exciter 140. In this manner, the terminal voltage may be maintained constant or controlled in any desired way independently of the variations of the load supplied by the generator.

Figure 12:
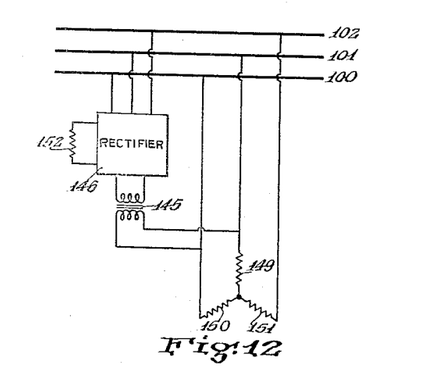
Figures 12 to 14 are diagrams representing examples of boosting systems for regulating the voltage at a consumer's point in an alternating current network by means of an arrangement described by the invention.
Figure 13:
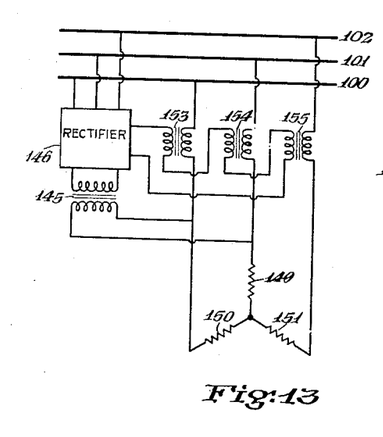
Figure 14:
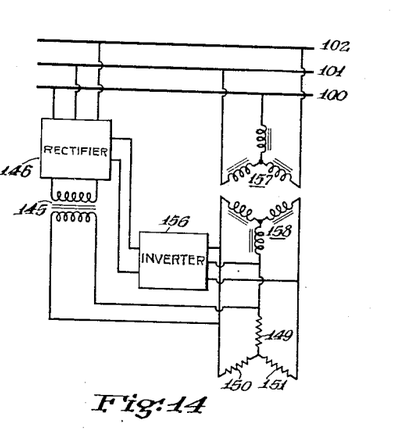

In Figures 12 to 14 there are shown diagrammatically boosting systems for maintaining the voltage at a point in an alternating current network at a predetermined value.

Referring to Figure 12, item 149, 150 and 151 represent a three phase load or consumer connected to the lines 100, 101, 102. A rectifier system 146 of the type according to the invention connected to the three-phase network feeds upon a load resistance 152, the output current being controlled by the load of the consumer 149—151 through a ripple current transformer in the manner described hereinabove. Thus, dependent on the load of the consumer 149—151 more or less current will be impressed upon and dissipated in the resistance 152 thereby controlling the potentials at the consuming point.

Figure 13 represents a system similar to Figure 12 wherein in place of a dissipating resistance there are provided three choke coils 153, 154, and 155 in series with the load having control windings for controlling the direct current magnetization in accordance with the output of the rectifier 146. In this manner a greater or lesser inductive voltage drop occurs between the line and the load dependent on the load current, whereby the potential at the consumer may be regulated in any desired manner such as to a constant value independently of load current variations.

According to the embodiment shown in Figure 14, the output of the rectifier 146 is impressed upon an inverter 156, the latter being connected to the terminals of the load 141—152. The latter in the example shown is supplied through three phase transformer having a primary 157 and secondary 158.

Figure 15:
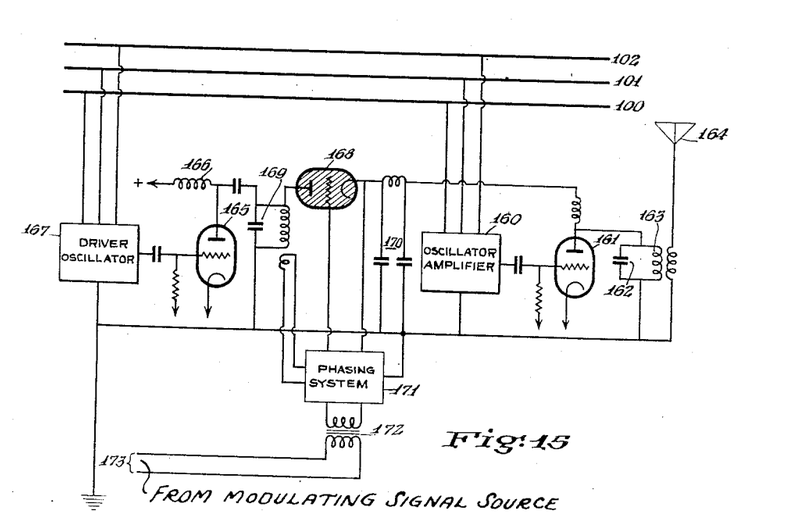
Figure 15 illustrates an amplitude modulating system for a radio transmitter constructed and operating in accordance with the principle described by the invention.

Referring to Figure 15 there is shown a system for amplitude modulation of a carrier current in accordance with a modulating signal for use in a radio transmitter or like signalling system. For this purpose, according to the present invention an auxiliary carrier current of an intermediate frequency such as about 10,000 cycles is rectified by means of a gaseous discharge rectifier and the rectified current or potential controlled by the modulating signal by phase control in accordance with the invention. The thus obtained rectified current is then impressed upon a carrier current modulator to supply anode potential whereby a correspondingly modulated final carrier is obtained for radiation by an antenna or transmission through a line. Referring to the drawings, there is shown at 160 a master oscillator generating a carrier having a frequency to be radiated and controlling a power amplifier 161. The latter feeds into a tuned circuit comprising an induction coil 163 shunted by condenser 162. The tuned circuit is coupled with an antenna 164 in a known manner. The high tension or anode potential for the power amplifier 161 which may consist of a plurality of amplifying valves in place of a single valve shown for simplicity of illustration is supplied by a gaseous rectifier system comprising a grid controlled rectifying tube 168 in the example illustrated and supplied by an intermediate frequency current of about 10,000 cycles from a tank circuit 169 connected to the output of an amplifier 165 excited by an oscillator or driver 167 generating currents of auxiliary frequency (10,000 cycles). As is understood the gaseous rectifier may comprise two or more valves, only a single valve 168 being shown in the drawings for convenience of illustration. Item 171 represents a phasing system of the type similar to that shown in Figure 9 and controlled on the one hand by currents of the auxiliary carrier frequency supplied from the circuit 169 and on the other hand by modulating currents supplied through transformer 172 from a microphone or the like connected to the lines 173. The phasing or firing potential generated by the system 171 is applied to the grid of the rectifier 168 whereby the rectified output current after suitable filtering by means of filter 170 varies in accordance with the modulating signal. Since this current serves as anode potential for the main power amplifier 161, the carrier frequency impressed upon the antenna will be amplitude modulated in accordance with the microphone or other modulating signals. With such a system the energy conversion efficiency is very high and may reach values up to 80%, similarly the efficiency of the power amplifier may have values as high as about over 5% resulting in overall efficiency of the transmitter of about 60%.

It will be evident from the above that the invention is not limited to the specific circuit arrangements and methods described herein for illustration, but that the novel concept and underlying inventive principle are susceptible of numerous modifications and variations coming within the broader scope of the invention as defined in the appended claims. The drawings and specification are accordingly to be regarded in an illustrative rather than in a limiting sense.

I claim:

1. In combination with a direct current and an alternating current system connected through a gaseous discharge converter comprising discharge starting means for controlling the current flow between said systems, means for controlling the initiation of the discharge, said means comprising a pair of resonant circuits tuned to the frequency of and energized by potential derived from said alternating current system, mutual reactive coupling means between said resonant circuits, means for impressing potential derived from one of said resonant circuits upon said discharge starting means, and further means for controlling the relative amplitude of the currents in said resonant circuits.

2. In combination with a direct current and an alternating current system connected through a gaseous discharge converter having discharge starting means for controlling the current flow between said systems, means for controlling the initiation of the discharge, said means comprising a pair of resonant circuits tuned to the frequency of and energized by current derived from said alternating current system, inductive coupling means between said resonant circuits, the non-reactive impedances of said resonant circuits being substantially equal to each other and to the mutual coupling inductance between said resonant circuits, and means for controlling the relative amplitude of the currents in said resonant circuits.

3. In combination with a direct current and an alternating current system connected through a gaseous discharge converter having discharge initiating means for controlling the current flow between said systems, means for timing the initiation of the discharge, said means comprising a pair of resonant circuits tuned to the frequency of and energized by current derived from said alternating current system, mutual inductive coupling means between said resonant circuits, means for applying firing potential derived from one of said resonant circuits to said initiating means, the non-reactive impedances of said resonant circuits and the mutual coupling inductance therebetween being designed to effect a phase shift of the currents in said circuits in proportion to the relative amplitude of the potentials impressed thereon, and means for controlling the relative amplitude of the currents in said resonant circuits in dependence upon the current in said direct current system.

4. In a system as claimed in claim 2 wherein said last means is comprised of a pair of crossed induction coils fixedly arranged at an angle relative to each other and each forming an element of one of said resonant circuits, a third induction coil arranged in mutual inductive relation with said crossed coils and serving for exciting said resonant circuits, and means for relatively displacing said crossed coils and said further induction coil.

5. In a system as claimed in claim 3, said last means comprising a pair of crossed induction coils arranged fixedly at a right angle relative to each other and each forming an effective element of one of said resonant circuits, a third induction coil arranged symmetrically and in inductive coupling relation with said crossed coils and serving for exciting said resonant circuits, and means for relatively rotating said crossed coils and said further induction coil in dependence upon the current in said direct current system.

6. In a system as claimed in claim 3, said last means comprising a pair of crossed induction coils fixedly arranged at a right angle relative to each other and each forming an effective element of one of said resonant circuits, a further induction coil arranged symmetrically and in inductive coupling relation with said crossed coils and serving for exciting said resonant circuits, and a moving coil actuator arranged to effect relative rotation of said crossed coils and said further induction coil in dependence upon the current in said direct current system.

7. In a system as claimed in claim 1, said last means comprising three electron discharge devices, means for simultaneously impressing upon the input of said devices potential derived from said alternating current system, means for impressing the output of the first device upon one of said resonant circuits, means for impressing the outputs of the remaining devices upon said other resonant circuit in push-pull, further means for impressing upon the input of said control potentials varying in proportion to the average rectified output of said system, the control potential impressed upon said push-pull connected devices being of opposite polarity, and means for applying steady bias to said devices, whereby the output currents set up in said resonant circuits considered individually vary substantially in accordance with sine and cosine functions, respectively, in dependence upon said control potential.

8. In a system as claimed in claim 1, said last means comprising three electron discharge devices, means for simultaneously impressing upon the input of said devices potential derived from said alternating current system, means for impressing the output of the first device upon one of said resonant circuits, means for impressing the outputs of the remaining devices upon the remaining resonant circuits in push-pull, further means for impressing upon the input of said devices potentials varying according to the average rectified output current of said system, the control potentials impressed upon said push-pull connected modulators being of opposite polarity, and means for applying steady bias to said modulators, whereby the output currents set up in said resonant circuits considered individually vary substantially in accordance with sine and cosine functions, respectively, in dependence upon said control potential, and further means whereby said control potential is derived from the rectified ripple current in said direct current system.

9. In a multi-phase converter connecting an alternating current and a direct current network and comprising at least one gaseous discharge path for each phase with control elements for initiating the discharge, means for producing discharge initiating potentials, said means comprising a control circuit tuned to the frequency of and energized by potential derived from the alternating current network, a cathode ray device having means for producing a concentrated electron beam, means for deriving time quadrature potentials from said control circuit, deflecting means for continuously rotating said beam in synchronism with the line frequency by said quadrature potentials, a plurality of target electrodes equal to the number of alternating current phases arranged to be sequentially impinged by the rotating electron beam and equally angularly spaced like the phases of said alternating current network, output circuits connected to said target electrodes closed through the electron beam, connections from each of said output circuits to the control element of corresponding phase of said converter, and means for adjusting the phase of the alternating current in said control circuit.

10. In a multi-phase converter connecting an alternating current and a direct current network and comprising at least one gaseous discharge path for each phase with a control element for initiating the gas discharge, means for producing discharge initiating potentials, said means comprising a control circuit energized from said alternating current network, a cathode ray device comprising means for producing a concentrated electron beam, a pair of deflecting devices oriented at right angles to each other, means for deriving quadrature deflecting energies and for impressing the derived energies upon each of said deflecting devices to cause said electron beam to continuously rotate in synchronism with the alternating current frequency, a plurality of target electrodes sequentially impinged by the electron beam being of equal number to the number of phases of said alternating current network and spaced by angular distances like the phases of said alternating current network, output circuits connected to said target electrodes completed through said electron beam, circuit connections from each of said output circuits to the control element of corresponding phases of said converter, and means for automatically adjusting the phase of the current in said control circuit in dependence upon the current flow in said direct current network.

JOZEF PLEBANSKI.